United States Patent
Jeong et al.

(10) Patent No.: US 8,325,555 B2
(45) Date of Patent: Dec. 4, 2012

(54) DATA STORAGE DEVICES AND POWER MANAGEMENT METHODS THEREOF

(75) Inventors: Tae-Min Jeong, Seoul (KR); Sang-Kyoo Jeong, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 392 days.

(21) Appl. No.: 12/654,702

(22) Filed: Dec. 29, 2009

(65) Prior Publication Data

US 2010/0211808 A1 Aug. 19, 2010

(30) Foreign Application Priority Data

Feb. 19, 2009 (KR) .................. 10-2009-0014039

(51) Int. Cl.
*G11C 8/00* (2006.01)
(52) U.S. Cl. ................... 365/230.03; 365/204
(58) Field of Classification Search ............. 365/230.06, 365/204
See application file for complete search history.

(56) References Cited

U.S. PATENT DOCUMENTS

| | | | |
|---|---|---|---|
| 2005/0144490 A1 | 6/2005 | Igari | |
| 2005/0185496 A1* | 8/2005 | Kaler | 365/230.06 |
| 2006/0069932 A1 | 3/2006 | Oshikawa et al. | |
| 2008/0094927 A1* | 4/2008 | Kim | 365/204 |

FOREIGN PATENT DOCUMENTS

| | | |
|---|---|---|
| JP | 2005-190202 | 7/2005 |
| JP | 2006-018388 | 1/2006 |
| JP | 2006-099665 | 4/2006 |

* cited by examiner

*Primary Examiner* — Jason Lappas
(74) *Attorney, Agent, or Firm* — Harness, Dickey & Pierce, P.L.C.

(57) ABSTRACT

A data storage device includes a data storage medium and a controller. The controller is configured to control at least one of a reading, erasing, and writing operation on the data storage medium. The controller includes an interface and a power management unit. The interface is configured to exchange at least one of a command, an address, and data with a host. The power management unit is configured to change the power mode of the interface into a power saving mode if: a command input from the host is not executed, data transfer is not actually executed in executing the command, or status information is not reported after the command is executed.

18 Claims, 6 Drawing Sheets

DATA STORAGE DEVICES AND POWER MANAGEMENT METHODS THEREOF

CROSS-REFERENCE TO RELATED APPLICATION(S)

This non-provisional U.S. patent application claims priority under 35 U.S.C. §119 to Korean Patent Application 10-2009-0014039, filed on Feb. 19, 2009, the entire contents of which are hereby incorporated by reference.

BACKGROUND

1. Field

Inventive concepts of example embodiments relate to electronic devices, for example, data storage devices and power management methods thereof.

2. Description of the Conventional Art

With the advent of the information society, the amount of data that individuals store and carry has tremendously increased. With increases in the demand for a data storage medium, a variety of individual storage devices have been developed.

Among conventional data storage devices, hard disk drives (HDDs) have been more widely used due to their relatively high record densities, relatively high data transfer speeds, relatively fast data access times, relatively low costs, etc. However, because HDDs generally have a relatively complicated structure of mechanical components, relatively small impacts and vibrations may cause HDDs to breakdown.

In recent years, a solid state disk (SSD) using a flash memory has been developed as a data storage device that may replace the hard disk drive. Unlike conventional HDDs, SSDs have no mechanical structure. Therefore, SSDs have reduced latency and mechanical drive times compared to HDDs. SSDs also execute reading/writing operations at relatively high speeds. Because SSDs reduce errors caused by latency and mechanical friction, reliability of reading/writing operations may improve. Moreover, because heat and noise occur relatively rarely during the operation of SSDs and SSDs are largely resistant to external impacts, SSDs are estimated to be more suitable for portable devices as compared to conventional HDDs.

SUMMARY

Example embodiments provide devices and methods for reducing power consumption of data storage devices. Example embodiments also provide devices and methods for improving power management efficiency by Device Initiated Power Management (DIPM), which is a power management method provided for an interface of a data storage device.

At least one example embodiment of an inventive concept provides a data storage device. The data storage device includes: a data storage medium and a controller. The controller is configured to control at least one of a reading, erasing, and reading operation on the data storage medium. In this example configuration, the controller includes an interface and a power management unit. The interface is configured to exchange at least one of a command, an address, and data with a host. The power management unit is configured to change the power mode of the interface into a power saving mode if: a command input from the host is not executed, data are not actually transferred in executing the command, or status information is not reported after the command is executed.

According to at least some example embodiments, the power management unit may provide power management functions by DIPM (Device Initiated Power Management) and the interface may support a SATA (Serial AT Attachment) interface. The data storage medium may include at least one nonvolatile memory electrically connected to at least one channel. The data storage device may be any one of a solid state disk, a hard disk, a flash memory card, and a flash memory system.

At least one other example embodiment of an inventive concept provides a power management method for a data storage device. According to at least this example embodiment, a command is received from a host, and a power mode of an interface is changed into a power saving mode if the data storage device is not ready to execute the command. The command is executed if the data storage device is ready to execute the command. The power mode is changed into the power saving mode if the data storage device is not ready to report status information corresponding to the execution result of the command. The status information is reported to the host if the data storage device is ready to report the status information.

According to at least some example embodiments, the power management method of the data storage device further includes: initializing the power mode to the power saving mode before the command is received. The command may be executed by changing the power mode into the power saving mode at an interval in which data are not actually transferred if the command requires a data transfer.

At least one other example embodiment of an inventive concept provides a data storage system. The data storage system includes: a host and a data storage device. The data storage device includes: a data storage medium and a controller. The controller is configured to control at least one of a reading, erasing, and reading operation on the data storage medium. In this example configuration, the controller includes an interface and a power management unit. The interface is configured to exchange at least one of a command, an address, and data with a host. The power management unit is configured to change the power mode of the interface into a power saving mode if: a command input from the host is not executed, data are not actually transferred in executing the command, or status information is not reported after the command is executed. The host is configured to transmit/receive at least one of the command, address, and data with to/from the interface.

At least one other example embodiment of an inventive concept provides a computing system. The computing system includes a microprocessor, a user interface, a modem and a data storage device. Each of the microprocessor, a user interface, a modem and a data storage device are connected to one another via a bus. The data storage device includes: a data storage medium and a controller. The controller is configured to control at least one of a reading, erasing, and reading operation on the data storage medium. In this example configuration, the controller includes an interface and a power management unit. The interface is configured to exchange at least one of a command, an address, and data with a host. The power management unit is configured to change the power mode of the interface into a power saving mode if: a command input from the host is not executed, data are not actually transferred in executing the command, or status information is not reported after the command is executed. The host is configured to transmit/receive at least one of the command, address, and data with to/from the interface.

BRIEF DESCRIPTION OF THE DRAWINGS

The accompanying drawings are included to provide a further understanding of example embodiments, and are incorporated in and constitute a part of this specification. The drawings illustrate example embodiments and, together with the description, serve to explain principles of at least some inventive concepts. In the drawings.

DETAILED DESCRIPTION

Figure 1:
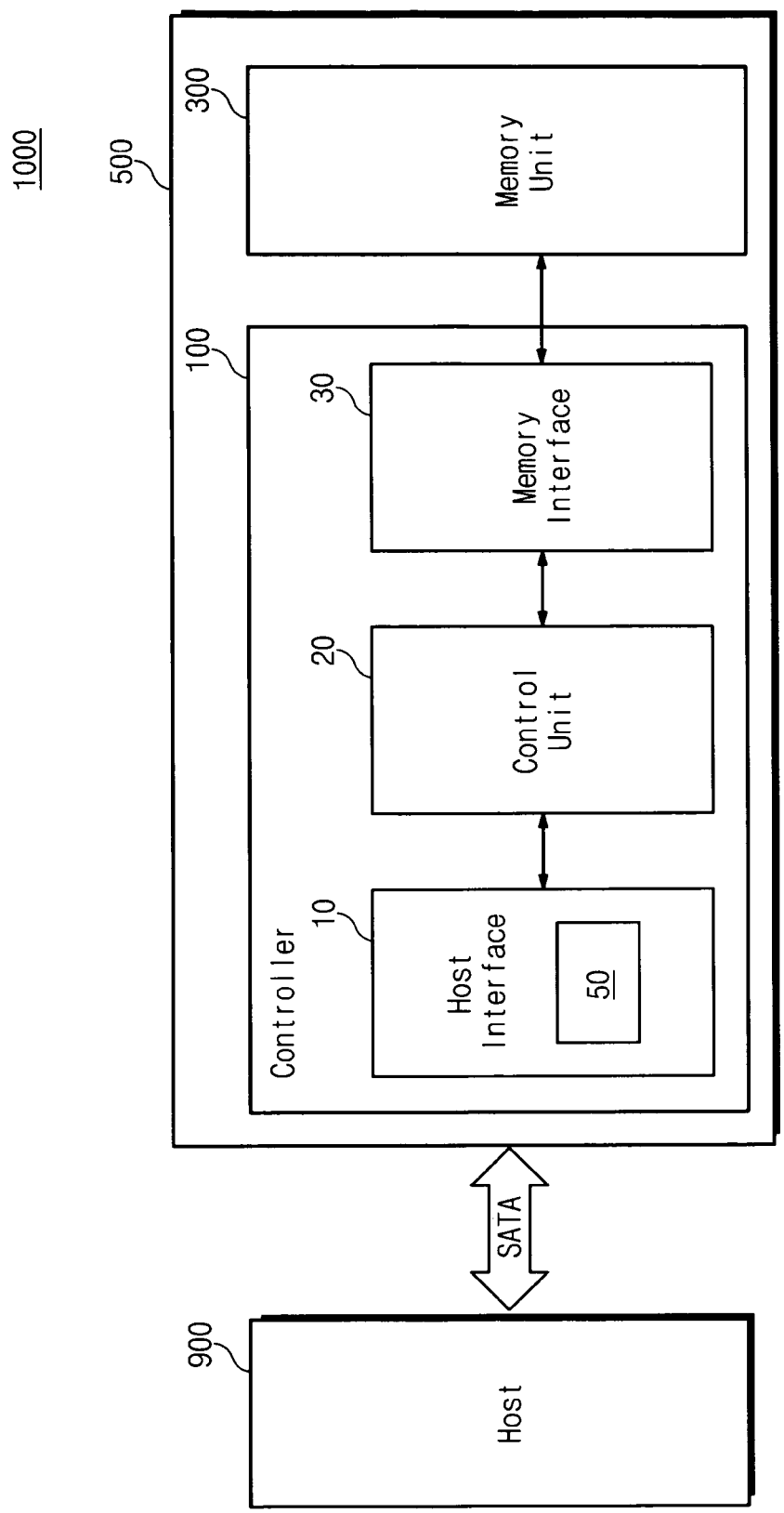
FIG. 1 is a block diagram illustrating a configuration of a data storage device and a data storage system including a data storage device according to an example embodiment.

Example embodiments of inventive concepts will now be described more fully with reference to the accompanying drawings, in which some example embodiments are shown. Like reference numerals in the drawings denote like elements.

Detailed illustrative embodiments are disclosed herein. However, specific structural and functional details disclosed herein are merely representative for purposes of describing example embodiments. Inventive concepts may, however, be embodied in many alternate forms and should not be construed as limited to only the example embodiments set forth herein.

It should be understood, however, that there is no intent to limit inventive concepts to the particular example embodiments disclosed, but on the contrary example embodiments are to cover all modifications, equivalents, and alternatives falling within the scope of inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of inventive concepts will be described in detail in conjunction with the accompanying drawings. However, the following example embodiment of the circuit configuration and operation of a data storage device are only examples and may, of course, by changed and be modified in many different forms within the technical scope of the technical scope of inventive concepts.

In order to reduce power consumption of, for example, a SATA (Serial ATA) interface, a data storage device according to example embodiments provides a DIPM (Device Initiated Power Management) function to a host interface. For example, a data storage device according to example embodiments allows the host interface to change or transition into Partial/Slumber states of a power saving mode and reduces power consumption when: a received input command is not immediately executed, data are not actually transferred in executing the received command, or status information is not immediately reported after the received command is executed. In addition, the data storage device allows the host interface to be returned to a PHYRDY state of an active mode and executes the relevant operation, when: the data storage device is ready to execute the received input command, the data storage device actually transfers data in executing the received command, or the data storage device is ready to report the information on the status of execution of the received command.

In a configuration according to at least this example embodiment, power consumption of the host interface of the data storage device may effectively be reduced. As a consequence, power consumption of the data storage device may be reduced.

As an example embodiment of a data storage device, a solid-state device (SSD) will be described in more detail below. However, the SSD is only an example. Accordingly, example embodiments may be applicable to any data storage device(s) in which the DIPM function is provided, like the SATA interface. For example, a data storage device and a power management method thereof according to an example embodiment may be applicable to a hard disk, a flash memory card/system, and the like, in which the DIPM function is provided.

FIG. 1 is a block diagram illustrating a configuration of a data storage device and a data storage system including a data storage device according to an example embodiment. In FIG. 1, an SSD will be described as an example of the data storage device 500. However, the SSD is only an example. Accordingly, example embodiments may be applicable to any data storage devices in which the DIPM function is provided, like the SATA interface.

Referring to FIG. 1, the data storage system 1000 includes a host 900 and a data storage device 500. The data storage device 500 includes a controller 100 and a memory unit 300. The memory unit 300 serves as a data storage medium of the data storage device 500. In this example, the memory unit 300 may store data using memory chips, rather than a hard disk drive (HDD). More specifically, for example, the memory unit 300 may be a nonvolatile memory such as a flash memory or the like. One or more channels (e.g., N channels) may be formed between the controller 100 and the memory unit 300. A plurality of flash memories may be electrically connected to each of the channels.

According to at least this example embodiment, the memory unit 300 may be a flash memory. But, the memory unit 300 is not limited to this specific kind or shape of non-volatile memory. Rather, the nonvolatile memory may be formed in a variety of kinds or shapes. For example, the memory unit 300 may be a magnetic random access memory (MRAM), a phase-change random access memory (PRAM), or the like in addition to the flash memory.

The number of data bits stored in each memory cell of the memory unit 300 may vary. For example, the memory unit 300 may include single-level flash memory cells in which 1-bit data is stored per cell, or multi-level flash memory cells in which multi-bit data is stored per cell. Alternatively, the memory unit 300 may include a combination of single-level flash memory cells and multi-level flash memory cells. Various kinds of memory cells forming the memory unit 300 may be used in various forms. For example, the memory unit 300 may include NAND flash memory cells or NOR flash memory cells. Alternatively, the memory unit 300 may include a combination of NAND flash memory cells and NOR flash memory cells. In addition, the memory unit 300 may include One-NAND flash memories in which a flash memory core and memory control logic are formed into a single chip.

The structure of a charge storage layer of the memory cells, which form the memory unit 300, may be formed in various shapes. For example, the charge storage layer of the memory cell may be comprised of conductive multi-crystalline silicon and may be formed using an insulating layer made of, for example, $Si_3N_4$, $Al_2O_3$, HfAlO, HfSiO, or the like. The structure of a flash memory using the insulating layer made of $Si_3N_4$, $Al_2O_3$, HfAlO, HfSiO, or the like as the charge storing layer is also referred to as a charge trap flash (CTF) memory.

Referring back to FIG. 1, the controller 100 is configured to control writing, erasing, and/or reading operations of the memory unit 300 in response to a command input (received) from the host 900. The controller 100 includes a host interface 10, a control unit 20, and a memory interface 30.

The control unit 20 controls various operations of the data storage device 500. The host interface 10 exchanges commands, addresses, and/or data with the host 900 under the control of the control unit 20. Also under the control of the control unit 20, the memory interface 30 exchanges data with the memory unit 300 (e.g., the flash memories forming the memory unit 300). In one example. the memory interface 30 is configured to support at least one of a NAND flash memory, a NOR flash memory, and a One-NAND flash memory. Moreover, the memory interface 30 is configured to selectively execute software and hardware interleaved operations through plural channels.

Still referring to FIG. 1, the host interface 10 exchanges data with the host 900 through at least one of a plurality of interfaces such as USB (Universal Serial Bus), MMC (Multi Media Card), PCI-E (PCI express), ATA (AT Attachment), SATA (Serial AT Attachment), PATA (Parallel AT Attachment), SCSI (Small Computer System Interface), SAS (Serial Attached SCSI), ESDI (Enhanced Small Disk Interface), an IDE (Integrated Drive Electronics), etc. In at least one example embodiment, the controller 100 and the host 900 communicate via a SATA interface. The SATA interface includes a power management unit 50 in which a DIPM function is provided. The DIPM function provides power management functions for the host interface 10.

The SATA interface standard defines three layers of the host interface 10. These three layers include: a physical layer, a link layer, and a transport layer. The physical layer transfers and receives data at relatively high speeds and analyzes the received contents of the data. The physical layer also outputs signals in response to a request from the link layer. The link layer requests signal output to the physical layer in response to a request from the transport layer. In addition, the link layer delivers the signals received from the physical layer to the transport layer. The transport layer controls data flow.

Among the three layers, the physical layer manages the power of the SATA interface in the SATA standard because the physical layer includes analog circuits consuming a relatively large amount of power. The power management function of the SATA interface may be classified as a HIPM (Host Initiated Power Management) provided at the host or a DIPM provided at a peripheral device such as the data storage device 500. According to at least one example embodiment, the power management function is executed by the DIPM for the data storage device 500.

The SATA interface standard defines the types of power modes supported by a DIPM operation mode, the levels of voltage supplied in each mode, time required for mode changes, etc. Conventionally, however, the SATA interface standard does not define in detail that the DIPM operation mode changes when a peripheral device (e.g., data storage device 500) executes a particular operation. Example embodiments provide a command processing method for changing the DIPM operation mode to reduce and/or minimize power consumption by the data storage device 500.

Figure 2:
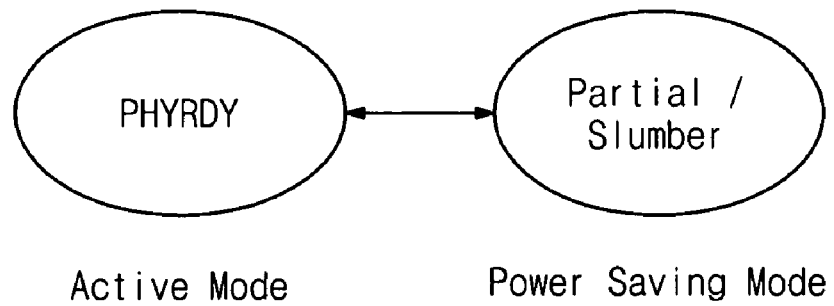
FIG. 2 is a diagram illustrating a power mode of a host interface supported by a power management unit according to an example embodiment.

FIG. 2 is a diagram illustrating an example embodiment of power modes (or power states) of the host interface 10 supported by the power management unit 50 of FIG. 1.

Referring to FIGS. 1 and 2, the power management unit 50 is configured to change the power mode of the host interface 10 between a PHYRDY state and a Partial/Slumber state. The PHYRDY state corresponds to the active mode, whereas the Partial/Slumber state corresponds to the power saving mode.

In the PHYRDY state, a circuit executing the physical layer operation of the host interface 10 and a PLL (Phase-Locked Loop) circuit operate. The PHYRDY state refers to an active state in which the interfaces of the host 900 and the data storage device 500 are synchronized with each other. In the Partial state and the Slumber state, an interface signal of the host interface 10 remains in a neutral state. The Partial state and the Slumber state refer to a power saving mode in which the host interface 10 does not practically operate. The Partial state and the Slumber state may be different with respect to the time at which the state is returned to the PHYRDY state. For example, according to the SATA standard, the time at which the Partial state returns to the PHYRDY state does not exceed about 10 μs, whereas the time at which the Slumber state returns to the PHYRDY state does not exceed about 10 ms.

As described in more detail below, the data storage device 500 may suppress and/or minimize power consumption of the host interface 10 by the power management unit 50. In particular, for example, the data storage device 500 may allow the host interface 10 to be changed (transitioned) into the Partial/Slumber states of the power saving mode when the host interface is: not immediately executing an input command, not actually transferring the data in executing the input command, or not immediately reporting status information after executing the input command. As a consequence, power consumption of the host interface 10 and the data storage device 500 including the host interface 10 may be reduced and/or minimized. The data storage device 500 may allow the host interface 10 to be returned to the PHYRDY state of the active mode and execute the relevant operations when the host interface 10 is: ready to execute the input command, actually transferring the data in executing the input command, or ready to report the status information. The configuration according to at least this example embodiment may reduce power consumption by the host interface 10 of the data storage device.

Figure 3:
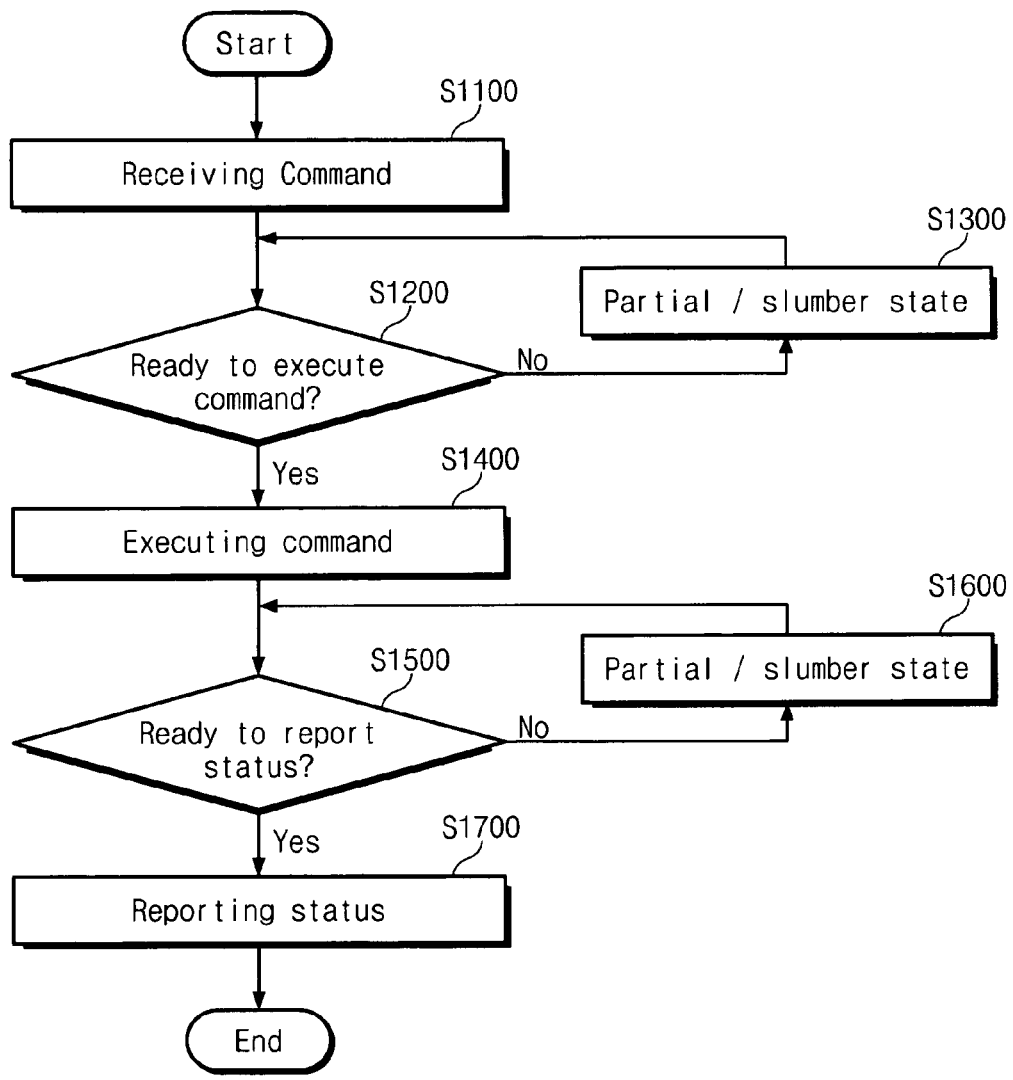
FIGS. 3 and 4 are diagrams illustrating power management methods of data storage devices according to an example embodiment.
Figure 4:
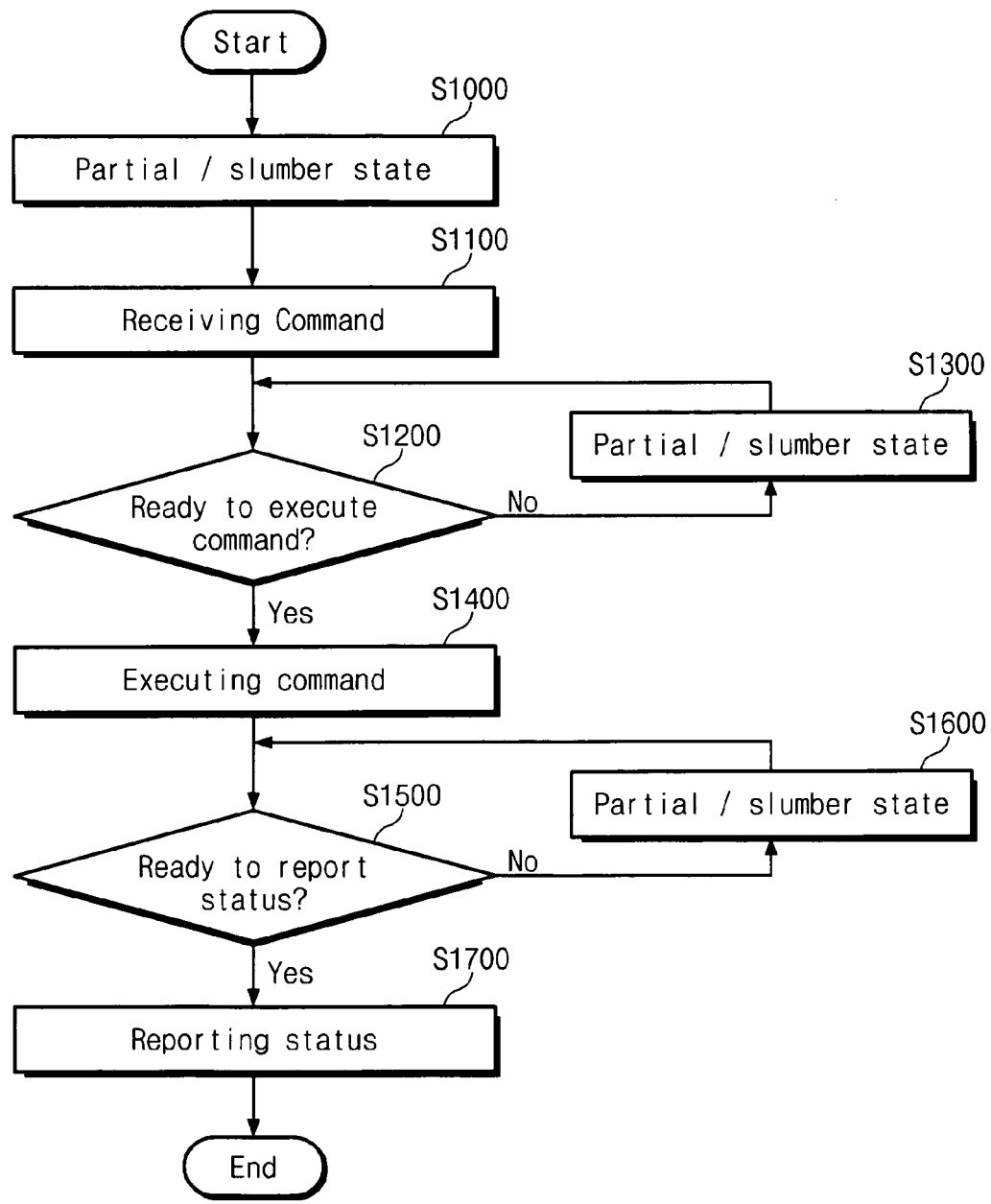

FIGS. 3 and 4 are flow charts illustrating power management methods for data storage devices according to example embodiments.

Referring to FIGS. 1 and 3, at S1000 the data storage device 500 receives a command from the host 900 through the host interface 10. Subsequently, at S1200 the data storage device 500 determines whether it is ready to execute the received (input) command (e.g., immediately). If, at S1200, the data storage device 500 is not ready to execute (e.g., immediately execute) the received command, the power management unit 50 changes the power mode of the host interface 10 into the Partial/Slumber states at S1300. The process then returns to S1200.

Returning to S1200, if the data storage device 500 is ready to execute (e.g., immediately execute) the received command, the data storage device 500 executes the command without changing the power mode (e.g., the PHYRDY state is maintained) at S1400.

After executing the command, at S1500 the data storage device 500 determines whether it is ready to report (e.g., immediately report) status information corresponding to the execution result of the input command. The status information reported at S1500 may be, for example, an error detection result, such as a CRC (Cyclic Redundancy Check) error detection result or an error detection result regarding a data length indicating whether the command has been executed normally and/or correctly.

If, at S1500, the data storage device 500 is not ready to report (e.g., immediately report) the status information, the power management unit 50 changes the power mode of the host interface 10 into the Partial/Slumber states at S1600. The process then returns to S1500.

Returning to S1500, if the data storage device is ready to report (e.g., immediately report) the status information, the data storage device 500 reports the status information to the host 900 without changing the power mode (e.g., the PHYRDY state is maintained) at S1700.

Referring now to FIGS. 1 and 4, at S1000 the power management unit 50 initializes the power mode (or power state) of the host interface 10 to the Partial/Slumber states as the default state. In this example embodiment, the power management unit 50 changes the power mode of the host interface 10 into the Partial/Slumber states before a command is input to suppress and/or minimize power consumption. Subsequently, the power management unit 50 controls the power mode of the host interface 10 according to whether the data storage device 500 is ready to execute the input command and whether the data storage device 500 is ready to report the status information.

The flowchart illustrated in FIG. 4 is substantially the same as the flowchart illustrated in FIG. 3, except that the power mode (or power state) of the host interface 10 is initialized to the Partial/Slumber states before receiving a command at S1100. Accordingly, the same reference numerals are denoted to the same operations or actions and a duplicated description is omitted. According to the power management method illustrated in FIG. 4, power consumption of the host interface 10 may be suppressed and/or prevented before the command is input. As a consequence, it is possible to reduce the power consumption compared to the power management method illustrated in FIG. 3.

Figure 5:
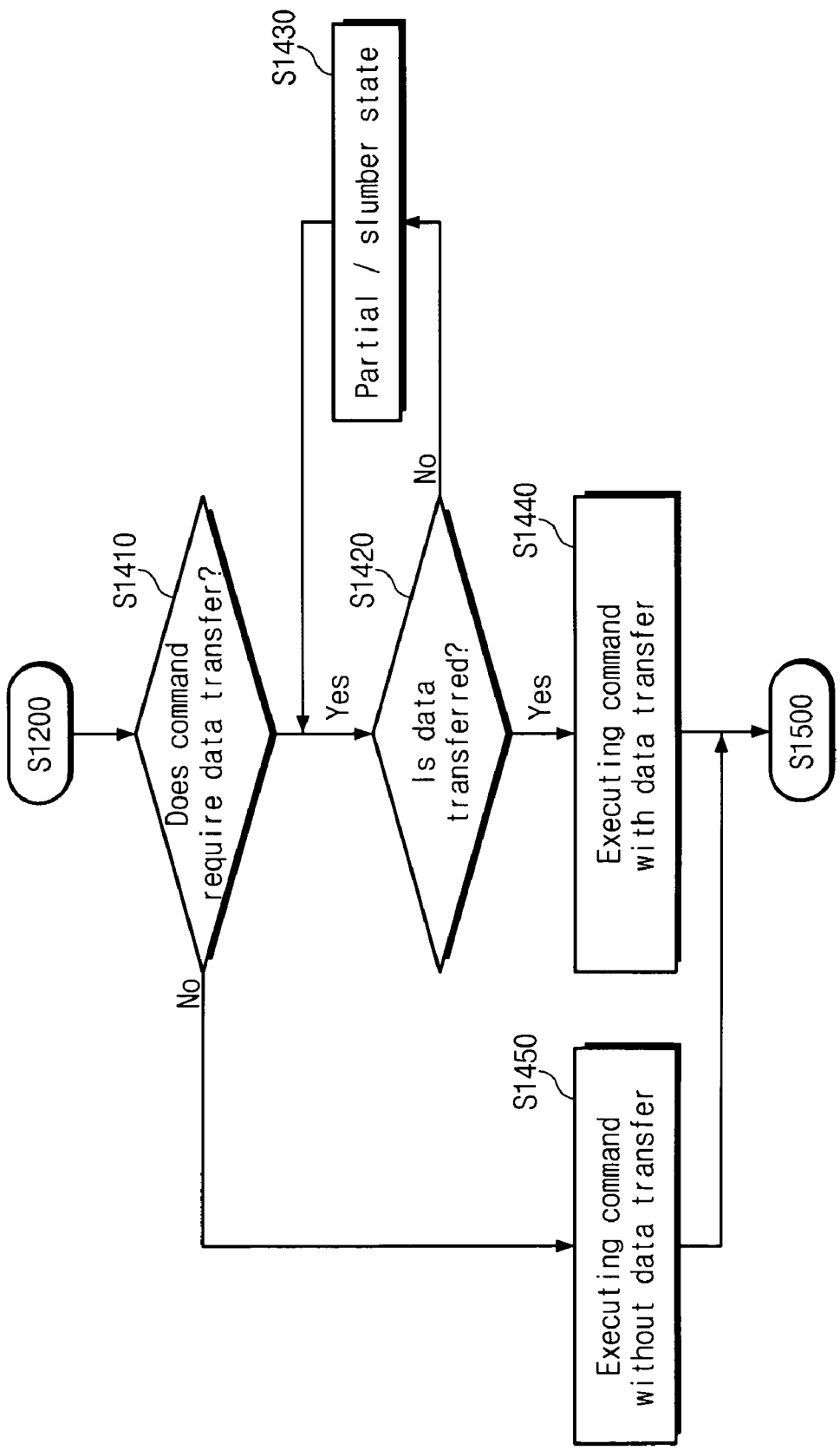
FIG. 5 is a flowchart illustrating a command execution (S1400) of FIGS. 3 and 4 according to an example embodiment.

FIG. 5 is a flowchart illustrating an example embodiment of executing a command (S1400) illustrated in FIGS. 3 and 4 in more detail.

Referring to FIG. 5, in order to execute a command, at S1410, the data storage device 500 determines whether the command requires data transfer. If the command requires data transfer, data storage device 500 determines whether the data (e.g., FIS (Frame Information Structure)) is actually transferred at S1420.

If data is not actually transferred, the power management unit 50 changes the power mode of the host interface 10 into the Partial/Slumber states at S1430. The process then returns to S1420 and continues.

Returning to S1420, if data is actually transferred, the power management unit 50 does not change the power mode of the host interface 10. The data storage device 500 then executes the relevant command using the transferred data at S1440. The process then continues to S1500 shown in FIGS. 3 and 4.

Returning to S1410, if the data storage device 500 determines that the command requires data transfer, the power management unit 50 does not change the power mode of the host interface 10. The data storage device 500 then executes the command without the data transfer at S1450. The process then continues to S1500 shown in FIGS. 3 and 4.

As described above, the power management unit 50 may change the power mode of the host interface 10' into the Partial/Slumber states to reduce and/or minimize the power consumption of the host interface 10 when the data storage device 500 does not execute (e.g., immediately execute) a received command. In addition, the power management unit 50 may also change the power mode of the host interface 10 into the Partial/Slumber states when not ready to report the status information to the host 900 after the received command is executed.

As illustrated in FIG. 4, because the power management unit 50 initializes the power mode of the host interface 10 to the Partial/Slumber states at the beginning, power consumption of the host interface 10 may be further reduced. In addition, as illustrated in FIG. 5, the power management unit 50 may change the power mode of the host interface 10 into the Partial/Slumber states at an interval in which the data (e.g., the FIS (Frame Information Structure)) is not actually transferred even when the command is executed. Accordingly, power consumption of the host interface 10 of the data storage device 500 may be suppressed and/or minimized. The reduction in the power consumption of the host interface 10 may be more useful for the power management of portable data storage devices having a limited power source.

Example embodiments illustratively describe a DIPM provided in the peripheral devices such as the data storage device 500 in a system supporting the SATA interface. However, power management methods according to example embodiments may be also applicable to a HIPM provided in the host. Although power management methods according to at least some example embodiments describe a SATA interface, example embodiments may be applicable to interfaces to which the power management such as the DIPM and the HIPM is provided.

Figure 6:
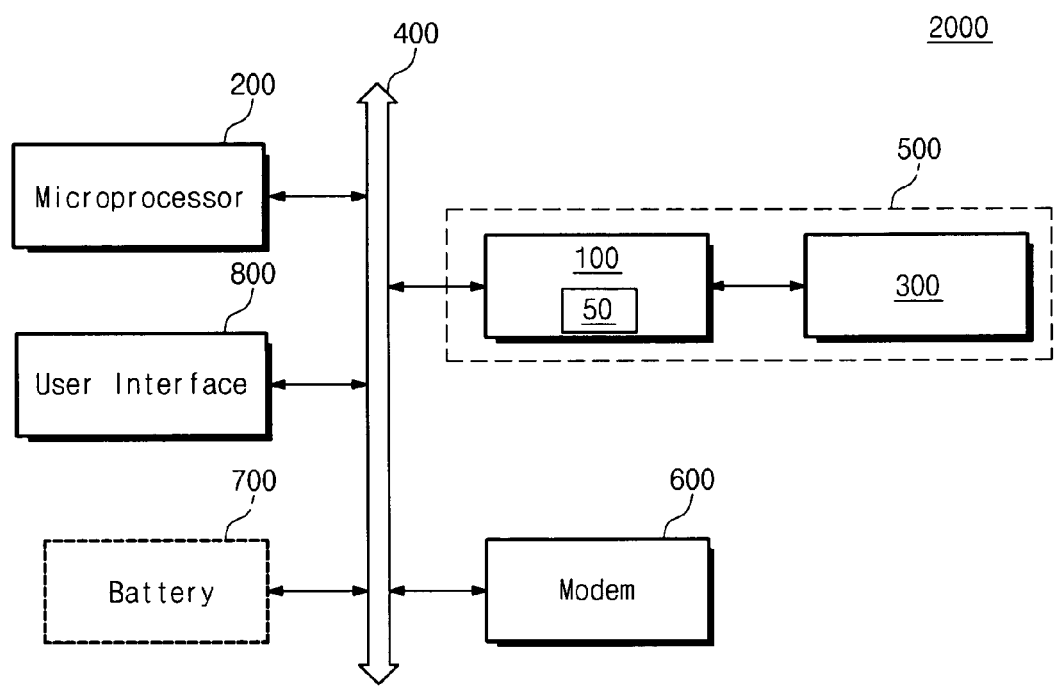
FIG. 6 is a diagram illustrating a configuration of a computer system according to an example embodiment.

FIG. 6 is a diagram illustrating an example embodiment of a configuration of a computing system.

Referring to FIG. 6, the computing system 2000 includes a data storage device 500, a micro processor 200, a modem 600

(e.g., a baseband chipset), and a user interface 800. Each of these components is electrically connected to a bus 400.

The data storage device 500 in FIG. 6 includes a controller 100 and the memory unit 300, and the detailed configuration of the controller 100 and the memory unit 300 illustrated in FIG. 6 may be the same or substantially the same as the configuration shown in FIG. 1. Accordingly, the same reference numerals refer to the same component and the duplicated description will be omitted below. The data storage device 500 may be a SSD, a memory card, a memory card system, etc.

To reduce the power consumption of a SATA (Serial ATA) interface, a power management unit provides a DIPM (Device Initiated Power Management) function for the host interface. For example, the power management unit changes the power mode of the host interface into the Partial/Slumber states of the power saving mode of the host interface when: the data storage device 500 does not execute (e.g., immediately execute) the input command, data transfer is not actually executed when the data storage device 500 executes the input command, or status information is not immediately reported after the data storage device 500 executes the input command.

In addition, the power management unit returns the power mode of the host interface to the PHYRDY state of the active mode of the host interface to execute an operation when: the data storage device 500 is ready to execute the input command, the data storage device 500 actually transfers data in executing the input command, or the data storage device 500 is ready to report the information on the status of the command execution. In the configuration according to at least this example embodiment, the power consumption of the host interface of the data storage device may effectively be reduced.

When the computing system 2000 according to at least this example embodiment is a mobile device, a battery 700 may also be included. The battery 700 supplies operational voltage to the computing system 2000. Although not illustrated in FIG. 6, the computing system 2000 may further include: an application chipset, a camera image processor (CIS), a mobile dynamic random access memory (DRAM), or the like. In recent years, memory units using different types of nonvolatile memories have a tendency to be mounted in laptop computers, desktop computers, server computers, etc. In such an environment, because example embodiments reduce and/or minimize power consumption, limits on the existing capability (e.g., the limited capacity of a battery) may be improved (e.g., considerably improved), thereby extending the use of the memory units using the nonvolatile memories.

According to at least some example embodiments, power consumption of the interface of the data storage device may be reduced. Therefore, efficiency of the power management of the data storage device is improved.

Example embodiments have been described in the specification with reference to the accompanying drawings. The terminology used therein is for the purpose of describing inventive concepts and is not intended to be limiting of the meaning or limiting of the scope of the appended claims. Therefore, it will be apparent to those skilled in the art that various modifications and equivalents can be embodied. Accordingly, the technical protective scope of inventive concepts is determined according to the technical spirit of the append claims.

What is claimed is:
1. A data storage device comprising:
   a data storage medium; and
   a controller configured to control at least one of reading, erasing, and writing operations on the data storage medium, the controller including,
      an interface configured to exchange at least one of a command, an address, and data with a host, and
      a power management unit configured to change the power mode of the interface into a power saving mode if:
         the data storage device is not ready to execute a command received from the host, the data storage device does not transfer data when executing the command, or the data storage device does not report status information after executing the command.

2. The data storage device of claim 1, wherein the power management unit provides power management functions by DIPM (Device Initiated Power Management).

3. The data storage device of claim 1, wherein the interface supports a SATA (Serial AT Attachment) interface.

4. The data storage device of claim 1, wherein the data storage medium comprises:
   at least one nonvolatile memory electrically connected to at least one channel.

5. The data storage device of claim 1, wherein the data storage device is one of a solid state disk, a hard disk, a flash memory card, and a flash memory system.

6. A power management method for a data storage device, the method comprising:
   receiving a command from a host;
   changing a power mode of an interface into a power saving mode if the data storage device is not ready to execute the received command;
   executing the received command if the data storage device is ready to execute the command;
   changing the power mode into the power saving mode if the data storage device is not ready to report status information corresponding to a result of an execution of the received command; and
   reporting the status information to the host if the data storage device is ready to report the status information.

7. The method of claim 6, further comprising:
   initializing the power mode to the power saving mode before receiving the received command.

8. The method of claim 6, wherein the executing the received command comprises:
   changing the power mode into the power saving mode at an interval in which data are not actually transferred when the received command requires data transfer.

9. A data storage system comprising:
   the data storage device of claim 1; and
   a host connected to the data storage device via a bus.

10. The data storage system of claim 9, wherein the power management unit provides power management functions by DIPM (Device Initiated Power Management).

11. The data storage system of claim 9, wherein the interface supports a SATA (Serial AT Attachment) interface.

12. The data storage system of claim 9, wherein the data storage medium comprises:
   at least one nonvolatile memory electrically connected to at least one channel.

13. A computing system comprising:
   the data storage system of claim 9; wherein
   the host is a microprocessor.

14. The computing system of claim 13, further comprising:
   a user interface coupled to the data storage device via the bus; and
   a modem coupled to the data storage device via the bus.

15. The computing system of claim 14, further comprising:
a battery coupled to the user interface, the modem and the data storage system via the bus; wherein
the battery is configured to provide operational voltage for the computing system.

16. The computing system of claim 13, wherein the power management unit provides power management functions by DIPM (Device Initiated Power Management).

17. The computing system of claim 13, wherein the interface supports a SATA (Serial AT Attachment) interface.

18. The computing system of claim 13, wherein the data storage medium comprises:
at least one nonvolatile memory electrically connected to at least one channel.

* * * * *